(12) United States Patent
Ahirwar et al.

(10) Patent No.: US 12,476,853 B2
(45) Date of Patent: Nov. 18, 2025

(54) TRANSMIT APPARATUS ARRANGED TO SCALE AND LIMIT FREQUENCY DEVIATION GENERATED AFTER A FILTERING BASED ON A FREQUENCY SHIFT KEYING (FSK) SIGNAL AND METHODS OF OPERATION

(71) Applicant: NXP USA, Inc., Austin, TX (US)

(72) Inventors: Vijay Ahirwar, Pune (IN); Khurram Waheed, Austin, TX (US); Mathieu Périn, Cairon (FR)

(73) Assignee: NXP USA, Inc., Austin, TX (US)

( * ) Notice: Subject to any disclaimer, the term of this patent is extended or adjusted under 35 U.S.C. 154(b) by 87 days.

(21) Appl. No.: 18/507,208

(22) Filed: Nov. 13, 2023

(65) Prior Publication Data

US 2025/0106076 A1 Mar. 27, 2025

(30) Foreign Application Priority Data

Sep. 24, 2023 (IN) .............................. 202341064061

(51) Int. Cl.
*H04L 27/20* (2006.01)
*H04L 27/12* (2006.01)

(52) U.S. Cl.
CPC ............ *H04L 27/206* (2013.01); *H04L 27/12* (2013.01)

(58) Field of Classification Search
CPC ..... H04L 25/03834; H04L 2025/03394; H04L 2025/03401; H04L 27/04; H04L 27/10; H04L 27/12; H04L 27/18; H04L 27/20; H04L 27/2003; H04L 27/206

USPC ........ 375/269, 272–274, 279–281, 295, 303, 375/305, 308; 332/100, 103; 455/108, 455/110
See application file for complete search history.

(56) References Cited

U.S. PATENT DOCUMENTS

| | | | |
|---|---|---|---|
| 2006/0013121 A1* | 1/2006 | Jiang ................... | H04B 7/18517 370/207 |
| 2013/0039397 A1* | 2/2013 | Stadelmeier ...... | H03M 13/2742 375/295 |
| 2014/0072077 A1* | 3/2014 | Cheng ................. | H04L 27/12 375/303 |
| 2015/0312684 A1* | 10/2015 | Knudsen ............. | H04R 25/552 381/23.1 |

FOREIGN PATENT DOCUMENTS

| | | |
|---|---|---|
| EP | 1913746 A2 | 9/2015 |
| WO | 0141381 A2 | 6/2001 |

OTHER PUBLICATIONS

V. K. Prabhu, "MSK and Offset QPSK Modulation with Bandlimiting Filters," in IEEE Transactions on Aerospace and Electronic Systems, vol. AES-17, No. 1, pp. 2-8. Jan. 1981.

* cited by examiner

*Primary Examiner* — Young T. Tse

(57) ABSTRACT

A transmit apparatus comprising a scaler arranged to scale a frequency deviation signal associated with a frequency shift keying signal (FSK) by a scale factor and a limiter arranged to limit frequency deviations of the scaled frequency deviation signal after a filtering. A power spectral density, phase trajectory, and frequency deviation of an FSK signal based on the limited scaled frequency deviation tracks similar criteria of a minimum phase shift keying (MSK) signal.

20 Claims, 4 Drawing Sheets

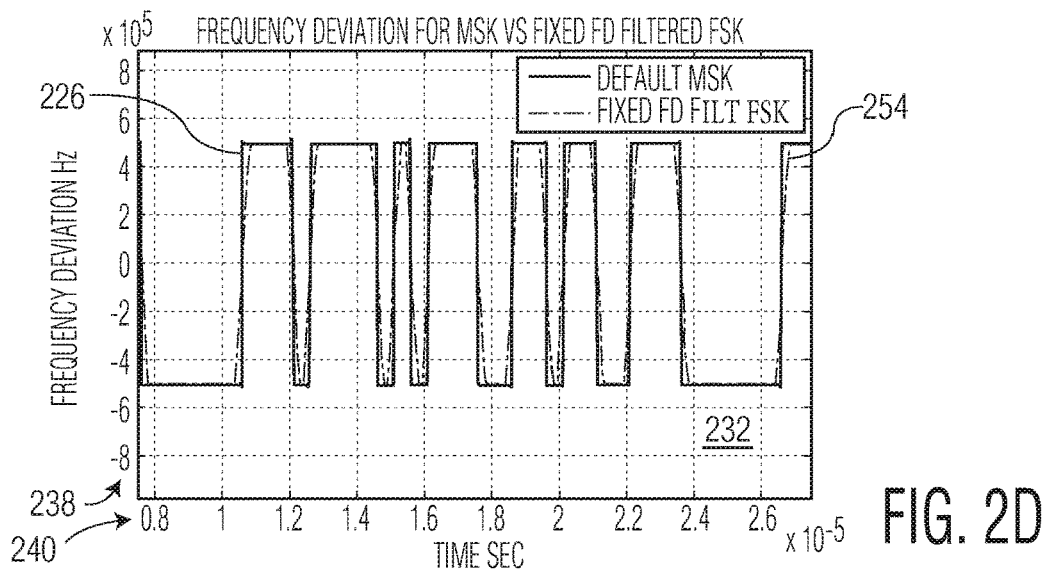

TRANSMIT APPARATUS ARRANGED TO SCALE AND LIMIT FREQUENCY DEVIATION GENERATED AFTER A FILTERING BASED ON A FREQUENCY SHIFT KEYING (FSK) SIGNAL AND METHODS OF OPERATION

CROSS-REFERENCE TO RELATED APPLICATIONS

This application claims the priority under 35 U.S.C. § 119 of India patent application No. 202341064061, filed on 24 Sep. 2023, the contents of which are incorporated by reference herein.

FIELD OF USE

This disclosure generally relates to wireless communication, and specifically scaling and limiting a frequency deviation generated based on offset quadrature phase shift keying (O-QPSK) converted to an FSK equivalent modulation and after a filtering based on a frequency shift keying (FSK) signal to improve spectrum and phase characteristics of a transmitted FSK signal.

BACKGROUND

Institute of Electrical and Electronics Engineers (IEEE) 802.15.4 which is a standard for low-rate wireless personal area network (LR-WPAN) communication describes an offset quadrature phase shift keying (O-QPSK) where bits of groups of four bits having a rate of 250 kbits per second and associated with data symbols to be transmitted is mapped to 32 chip pseudonoise (PN) chip sequences having a rate of 2 Mchips per second for transmission. A chip of a group of two chips in the 32 chip PN chip sequence has a value of "1" or "0" and is referred to as a QPSK chip. Each chip has a duration of two-times a chip period and groups of two chips are mapped to one of four constellation points in a QPSK constellation. The constellation point to which a group of two chips is mapped is represented by an in-phase (I) component and a quadrature-phase (Q) component of the QPSK constellation. Each group includes an even chip and an odd chip. The I component (even chips of groups) and Q component (odd chips of groups) indicate a corresponding chip value of the two chips mapped to the constellation point. Then the odd chips forming the Q component are delayed by one chip period with respect to the even chips forming the I component, leading to an O-QPSK signal. For a direct-conversion transmitter or for a polar transmitter where a phase locked loop (PLL) is directly frequency modulated, the I component and Q component offset in time coming from an O-QPSK modulator circuit are converted by an FSK modulation circuit to facilitate transmission of an FSK signal.

BRIEF DESCRIPTION OF THE DRAWINGS

FIGS. 2A-2F illustrate example plots of a frequency deviation signal at various points in the transmit apparatus and spectrum and phase trajectory of an FSK signal generated based on the frequency deviation signal in accordance with an embodiment.

Figure 1:
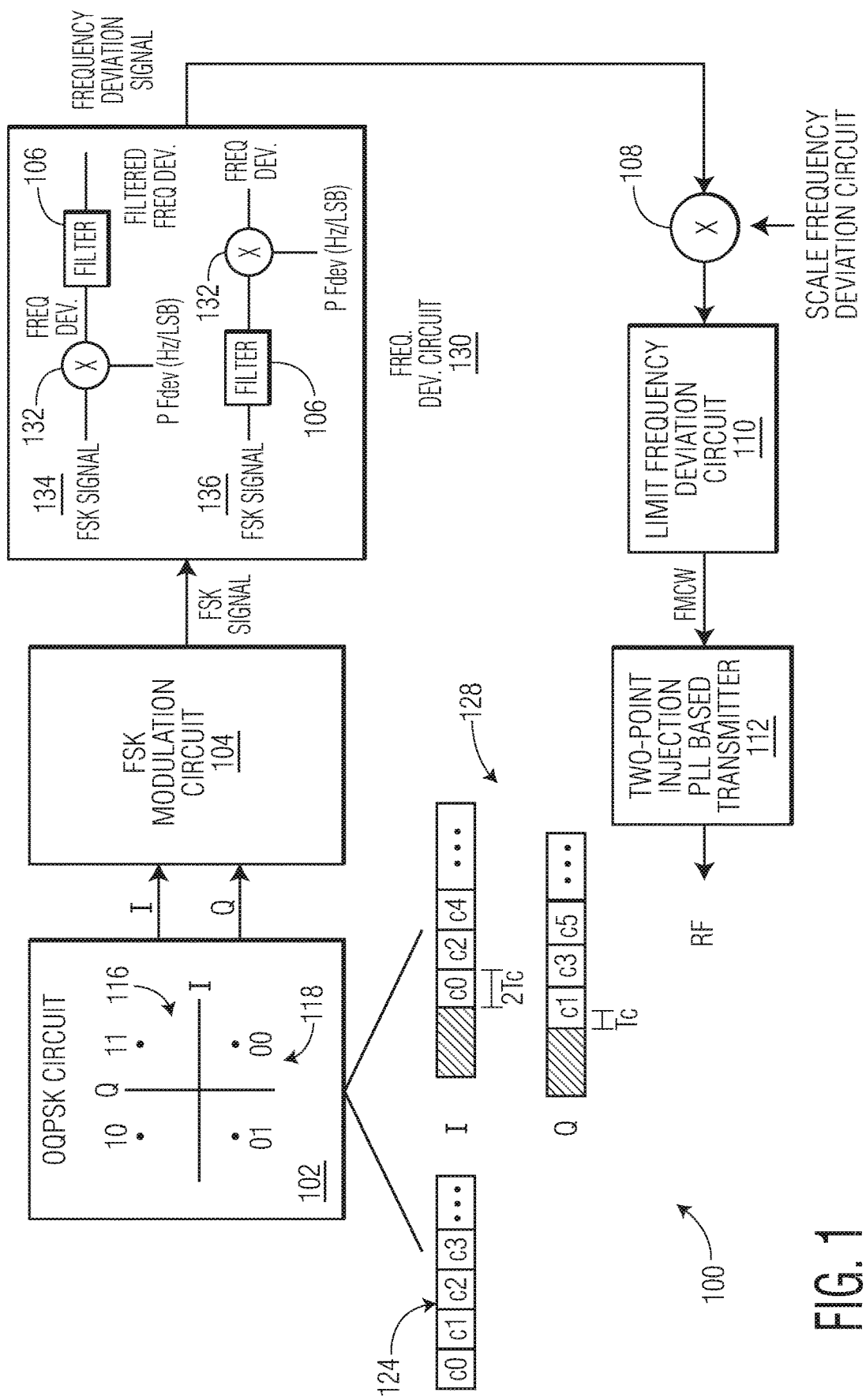
FIG. 1 illustrates an example transmit apparatus based on a two-point injection phase lock loop (PLL) where offset quadrature phase shift keying (O-QPSK) modulation of a signal is converted to frequency shift keying (FSK) modulation and followed by filtering in accordance with an embodiment.
Figure 2A:
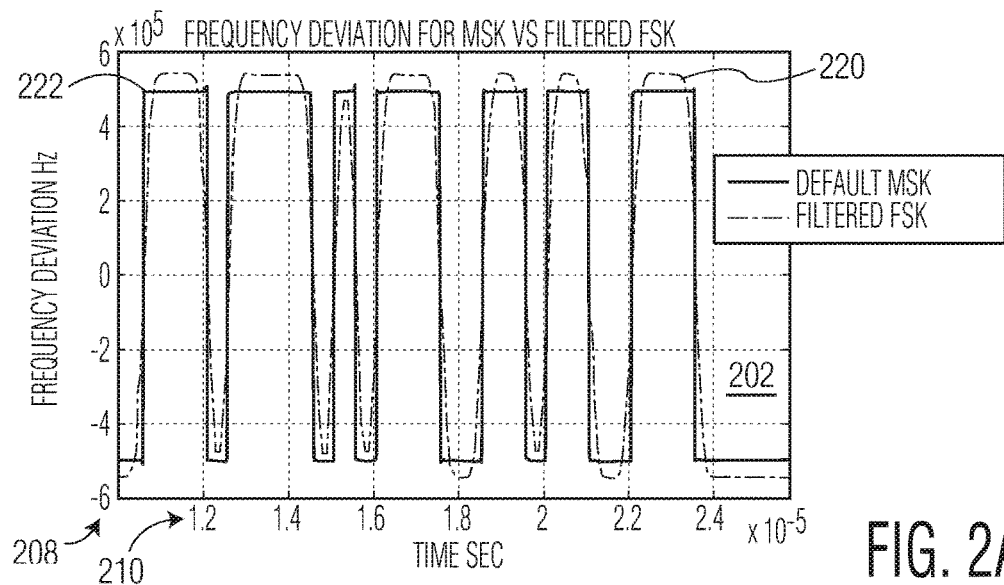
Figure 2B:
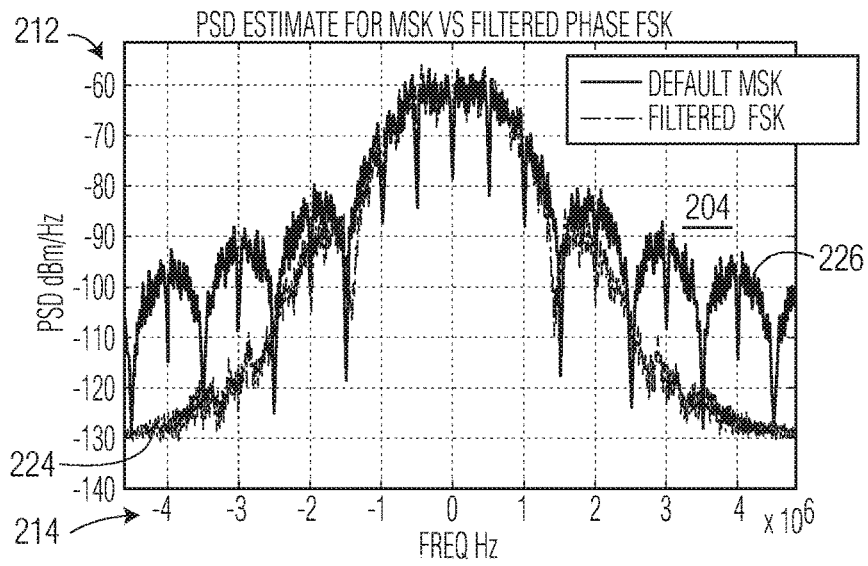
Figure 2C:
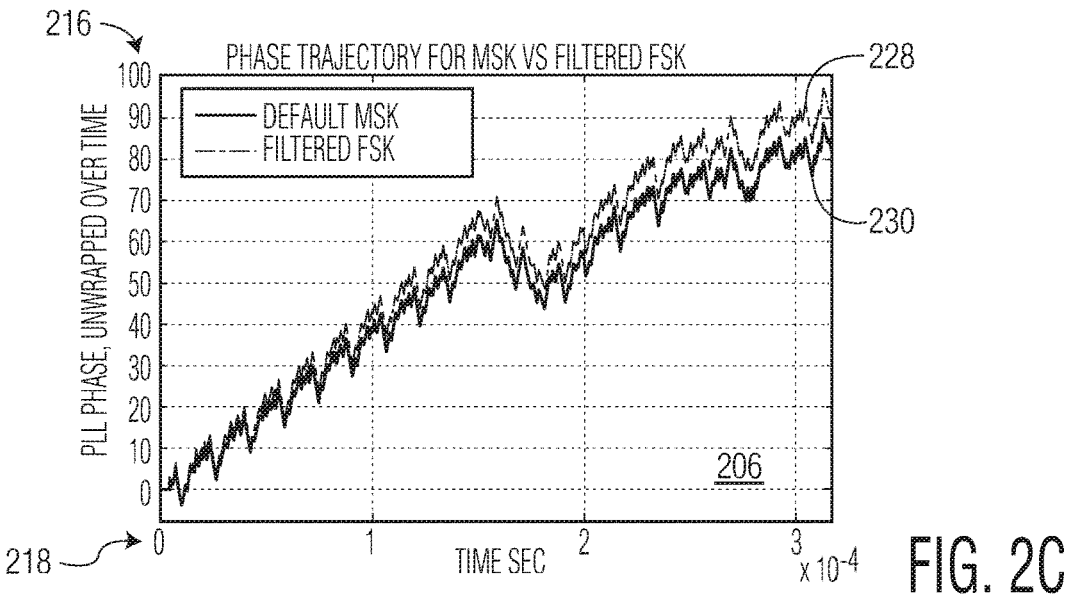

The drawings are for the purpose of illustrating example embodiments, but it is understood that the embodiments are not limited to the arrangements and instrumentality shown in the drawings.

DETAILED DESCRIPTION

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Offset quadrature phase shift keying (OQPSK) modulation of a signal is converted to a frequency shift keying (FSK) modulation of the signal to facilitate transmission of the signal. The O-QPSK modulation to FSK modulation corresponds to cartesian (IQ modulation) to polar (amplitude/phase) conversion where an amplitude of a signal based on FSK is constant and phase varies. To contain a FSK signal spectrum to a certain channel bandwidth, a filtering is applied to the FSK signal to form a filtered FSK signal with a corresponding frequency deviation as a function of time. Alternatively, to contain a FSK signal spectrum to a certain channel bandwidth, a filtering is applied to the frequency deviation of the FSK signal as a function of time to generate the filtered frequency deviation and then FSK signal. In either way the filtering causes the respective frequency deviation indicative of "0" or "1" chips to not be fixed and a phase trajectory of the FSK signal which would be generated by the resulting frequency deviation as a function of time to deviate with respect to a phase trajectory of the FSK signal before filtering. Some receivers are designed to receive signals with a respective frequency deviation indicative of a "0" or "1" chip being fixed and the filtering causes problems in reception. Specifically, the filtering produces an equivalent modulation memory which can be interpreted as inter-symbol-interference or hysteresis of discrete frequencies.

Embodiments disclosed herein are directed to a signal processing method and apparatus to perform a filtering based on the FSK signal but output an FSK signal which has a respective frequency deviation indicative of a "0" or "1" chip which are fixed and a phase trajectory which correspond to the FSK signal before filtering. In examples, transmit apparatus has an O-QPSK circuit and an FSK modulation circuit. The O-QPSK circuit maps chips which represent bits of sequence of bits to an in-phase component and a quadrature phase component of an O-QPSK constellation. An FSK modulation circuit performs FSK modulation on the QPSK chips of the components to output an FSK signal which is input to a frequency deviation circuit. The frequency deviation circuit performs a filtering and multiplication based on the FSK signal and outputs a frequency deviation signal. The transmit apparatus also includes a frequency deviation scaler and a frequency deviation limiter. The frequency deviation signal is scaled by the scaler and the scaled frequency deviation is limited by the frequency deviation limiter. A resulting frequency deviation signal is then provided to a two point injection phase locked loop (PLL) based transmitter which generates an FSK signal at a carrier frequency for transmission based on the frequency deviation signal input. The FSK signal based on the scaled and limited frequency deviation signal is an FSK signal which is limited to a desired bandwidth defined by the filter while the limiter maintains the fixed frequency deviation indicative of a "0" or "1" chip and a phase trajectory of the FSK signal which correspond the FSK signal before filtering. Well known instructions, protocols, structures, and techniques have not been shown in detail in order not to obfuscate the description.

Example Systems

FIG. 1 illustrates an example transmit apparatus based on a two-point injection phase lock loop (PLL) where offset quadrature phase shift keying (O-QPSK) modulation of a signal is converted to frequency shift keying (FSK) modulation and followed by filtering in accordance with an embodiment. The transmit apparatus 100 includes an O-QPSK circuit 102, a frequency shift keying (FSK) modulation circuit 104, and a frequency deviation circuit 130. In examples, the transmit apparatus 100 further includes a scale frequency deviation circuit 108 and a frequency deviation limiter circuit 110 which is coupled to a two-point injection phase locked loop (PLL) based transmitter 112. In an example, one or more circuits of the transmit apparatus 100 may be implemented with circuitry such as one or more of analog circuitry, mix signal circuitry, memory circuitry, logic circuitry, and processing circuitry that executes code stored in a memory that when executed by the processing circuitry performs the disclosed functions, among other implementations. In an example, the implementation may be a system on a chip (SoC) which implements functions of Institute of Electrical and Electronics Engineers (IEEE) 802.15.4 which is standard for low-rate wireless personal area network (LR-WPAN) communication.

IEEE 802.15.4 describes offset quadrature phase shift keying (O-QPSK) where bits of a group of four bits having a rate of 250 kbits per second and associated with a data symbol to be transmitted are mapped to a 32 chip pseudonoise (PN) chip sequence having a rate of 2 Mchips per second. A chip of a group of two chips in the 32 chip PN chip sequence has a value of "1" or "0" and is referred to as a QPSK chip. Each QPSK chip has a duration of two-times a chip period and groups of two chips are mapped to one of four constellation points in a QPSK constellation 116. In signal processing, the QPSK constellation 116 is a diagram that illustrates possible constellation points that the transmit apparatus 100 uses to transmit data. The constellation points 118 in the constellation 116 are identified by an amplitude along an in (I) phase axis and an amplitude along a quadrature (Q) phase axis of the constellation 116. In an example, the constellation 116 is a specific constellation associated with quadrature phase shift keying (QPSK) where a group of two chips, e.g., "00", "11", "01" or "10", is mapped to a respective constellation QPSK symbol of four constellation QPSK symbols 118 in the constellation 116.

In an example, a chip source may generate a chip sequence 124 which is based on bits of a data symbol to be transmitted and is referred to as chips $c_o$-$c_n$ (where n>1) each with a value of "0" or "1". Two successive chips in the plurality chips $c_i$, $c_{i+1}$ may be mapped to one of four constellation QPSK symbols 118 ("00", "01", "10" and "11") in the constellation 116 based on a value of a chip in a group of two chips. For example, chips with value of "00" may be mapped to QPSK constellation symbol 1, chips with values of "01" may be mapped to QPSK constellation symbol 2, chips with values of "10" may be mapped to QPSK constellation symbol 3, and chips with values of "11" may be mapped to QPSK constellation symbol 4. The QPSK constellation symbol 118 to which each of groups of two chips are mapped may be identified by an amplitude of an I phase component and an amplitude of Q phase component corresponding to the I phase and Q phase axes of the constellation 116. The chips $c_o$ and $c_1$ or $c_2$ and $c_3$ for example may map to a respective QPSK constellation symbol 118 such that the I phase component may indicate values of I components of the even chips of groups of two chips $c_0$, $c_2$, $c_4$ etc. and the Q phase component may indicate values of Q phase components of the odd chips of groups of two chips $c_1$, $c_3$, $c_5$ etc., or vice versa (not shown).

A timing offset Tc may be introduced to the I and Q component 128 where 2Tc is a period of a chip. The I and Q components 128 with the timing offset is referred to as Offset QPSK (O-QPSK). The frequency shift keying (FSK) modulation circuit 104 receives the I and Q components from the O-QPSK circuit 102 and generates an FSK signal based on the I and Q components. The I and Q components 128 if modulated on respective orthogonal carrier signals which are then combined to form an QPSK signal may have a varying amplitude and phase where a phase of the QPSK signal may vary between 0, pi/2, pi, -pi/2 at a time. The FSK signal output by the FSK modulation circuit 104 typically has an envelope of normalized rectangular pulses with amplitudes of -1 and +1 encoded as respective positive and negative frequency deviations of a reference frequency with phase to represent the QPSK signal.

The frequency deviations of the FSK signal as a function of time may be indicated in a frequency deviation signal. A two point injection PLL is a wideband frequency modulator having two separate paths with different signal conditioning to generate the FSK signal based on the frequency deviation signal. In an example, frequency modulated control words (FMCW) indicative of respective frequency deviations in the frequency deviation signal may be provided to the two point injection PLL which generates an FSK signal based on the FMCW. Each FMCW may represent as a sign and magnitude of a frequency deviation of the FSK signal normalized to the two point injection PLL reference frequency. For example, if the two-point injection PLL has a 32 MHz reference frequency and the frequency deviation is 500 kHz, FMCW in decimal is equal to 0.015625 and FMCW is quantified as s10.10, meaning 10 bits with signed representation and a fractional part of 10 bits, then FMCW=0d16=0x10 as an example. Based on the frequency deviation signal, the FSK signal output by the two point injection PLL based transmitter 112 may be equivalent to $$x(t)=x_e(t)\cos(\pi t/2T)\cos(2\pi f_c t)+x_o(t)\sin(\pi t/2T)\sin(2\pi f_c t)$$

where $x_e$ are amplitude of the even pulse sequence (I component) and $x_o$ are the amplitude of the odd pulse sequence (Q component) and $f_c$ is a carrier frequency. Using trigonometric identities, the above equation can also be written as:

$$x(t) = \cos\left(2\pi f_c t + b_k(t)\frac{\pi t}{2T} + \phi_k\right)$$

where $$b_k = -x_e x_o \text{ and}$$

-continued $$\phi_k = 0, \text{ if } x_e = +1$$
$$= \pi, \text{ if } x_e = -1$$

The FSK signal output by the two-point injection PLL based transmitter 122 is represented as a signal with a shift in one of two frequencies $$fc + \frac{1}{4T_c}$$

or $$fc - \frac{1}{4T_c}$$

which corresponds to the frequency deviation from a carrier frequency $f_c$ input to the two-point injection PLL. This FSK signal is referred to as a Minimum Shift Keying (MSK) signal because half-sine wave pulses are used to represent the chips of the I and Q components during the modulation. The shift between the two frequencies is referred to herein as a fixed frequency deviation indicative of the respective "0" and "1" chip.

The frequency deviation signal may be representative of a square wave of the frequency deviations as a function of time that cause side lobes in a signal spectrum of the FSK signal generated based on the frequency deviation signal. To reduce this side lobes, a filtering based on the FSK signal may be performed. In an example, the FSK signal may be provided to the frequency deviation circuit 130 which outputs a frequency deviation signal indicative of the frequency deviation as a function of time of the FSK signal based on the filtering. One of two signal flows illustrated as signal flow 134 and signal flow 136 may process the FSK signal. In signal flow 136, the FSK signal may be filtered by a filter 106 and the filtered FSK signal multiplied by a multiplier 132 and a peak frequency deviation (pfdev) to generate the frequency deviation of the FSK signal. In an example, the filter 106 is a Gaussian pulse shaping filter. The Gaussian pulse shaping filter may have a normalized 3-dB bandwidth-symbol time product BTs of 0.5, 0.7, and 2.0 in an example whereas BTs increases, a pulse width of the filtered phase FSK signal decreases causing less inter-symbol interference. To illustrate, if pfdev=500 kHz/least significant bit (LSB) for a FSK signal toggling between +1 LSB and −1 LSB of the FSK signal, a signal toggling between +500 kHz and −500 kHz may be indictive of the frequency deviation. If fdev is expressed in the normalized to PLL reference frequency form, fdev will be equal to 0.015625 or 0d16/LSB assuming s10.10 bitwidth, the +/−1 LSB of the FSK modulator, will become +/−16 after the multiplier. In the signal flow 134, the FSK signal may be multiplied by the multiplier 132 and the pfdev to generate from the FSK signal the frequency deviation of the FSK signal which is then filtered by filter 106 to output a filtered frequency deviation. The frequency deviation circuit 130 outputs a frequency deviation signal based on the frequency deviation output by signal flow 136 or filtered frequency deviation output by signal flow 134. Further, a respective FSK signal generated based on the frequency deviation output by signal flow 136 or filtered frequency deviation output by signal flow 134 may be substantially equivalent.

A side effect of the filtering is that the frequency deviation based on the FSK signal may not be a square wave as a function of time. This variation may cause reception problems with some receivers which receive an FSK signal based on the filtering because they are designed to only receive the FSK signal with a respective frequency deviation indicative of the "0" and "1" chip which is fixed. Further, the filtering produces an equivalent phase memory which can be interpreted as inter-symbol-interference or hysteresis of discrete frequencies associated with the FSK signal with the filtering and change a phase trajectory of a final transmit signal compared to the FSK signal before filtering.

Embodiments disclosed herein are directed to a signal processing method and transmit apparatus 100 to perform a filtering based on the FSK signal but output an FSK signal which has a respective fixed frequency deviation indicative of a "0" or "1" chip and a phase trajectory which correspond to the FSK signal before filtering. The scale frequency deviation circuit 108 and limiter circuit 110 facilitates generating such an FSK signal. The scale frequency deviation circuit 108 may be a multiplier which multiplies the frequency deviation signal output by the frequency deviation circuit 104 by a scaling factor. In an example, the filtering changes a slope in the frequency deviation signal. In an example, a frequency deviation signal indicative of fast "101010" transition of chips in an example may not reach a positive fixed frequency deviation (represented "1") before transitioning to a negative frequency deviation (represented by "0") as a result of the filtering but a slow transition "0000111100001111" will reach the negative or positive frequency deviation after the filtering for at least one chip in a sequence of chips with a same value. Applying a scaling factor which is greater than one to the filtered frequency deviation signal may increase a slope in the frequency deviation signal and result in fast transitions reaching the two frequencies of the fixed frequency deviation indicative of the "0" and "1" chip and the slow transitions exceeding it. In an example, the scaling factor may be determined experimentally so that the scaling factor multiplied by the frequency deviation signal results in an amplitude of the scaled frequency deviation signal which is substantially close to or above the positive fixed frequency deviation of the FSK signal output by the FSK modulation circuit 104 and substantially close to or below the negative fixed frequency deviation of the FSK signal output by the FSK modulation circuit 104. Further, the frequency deviation limiter circuit 110 limits the scaled frequency deviation signal to a predetermined value. The limiter circuit 110 may clamp the filtered scaled frequency deviation signal to the respective fixed frequency deviation indicative of "0" and "1" chip such that if the input-frequency deviation>maxfixedfdev then out=maxfixedfdev, elseif input-frequency deviation<minfixedfdev then out=minfixedfdev, else out=input frequency deviation, where maxfixedfdev is the predetermined maximum frequency deviation (e.g., positive deviation) and minfixedfdev is the predetermined minimum frequency deviation (e.g., negative deviation). The output of the frequency deviation limiter circuit 110 allows a phase trajectory of an FSK signal based on the scaled and limited frequency deviations to be similar to a phase trajectory of the frequency deviation of the FSK signal before filtering. In other words the hysteresis or the phase memory is lessened while achieving better transmit spectrum.

In an example, an FMCW of the frequency deviations indicated by the frequency deviation signal output by the limit frequency deviation circuit 110 is provided to the two-point injection PLL based transmitter 112 which generates a radio frequency (RF) signal for transmission per chip represented as $\sin(2\pi(f_i \pm f_c)t)$ where $f_i$ is the channel center frequency and $f_c$ is based on the frequency deviation signal input. In an example, the two-point injection PLL based transmitter 112 may perform a conversion of the frequency deviation signal to a phase signal and generate the transmit signal. For example, the two-point PLL injection based transmitter 112 may receive the frequency deviation signal and perform an integration of the frequency deviation signal to convert to a phase of the transmit signal according to the following relationships:

FrequencyDeviation(fd)=function(derivative(phi)/$dt$)

Phase=function(integral of fd)

If the frequency deviation signal increases by +df as an example, going to the phase domain (integration) the phase of the radio frequency (RF) signal increases over time by 2*pi*(fcarrier+df)*t in the two-point injection PLL based transmitter 112. If the frequency deviation signal decreases by −df, the phase of the RF signal decreases over time by 2*pi*(fcarrier−df)*t in the two-point injection PLL based transmitter 112. Further, in an example, the frequency deviation signal may not indicate the frequency deviation in Hz but is rather normalized to a reference frequency of the digital baseband and expressed by a fixed point representation.

FIGS. 2A-2F illustrate example plots 202-206, 232-236 of a frequency deviation signal at various points in the transmit apparatus 100 and a frequency spectrum and phase trajectory of an FSK signal generated based on the frequency deviation signal in accordance with an embodiment. In an example, IEEE 802.15.4 defines O-QPSK signal which is similar to a minimum phase shift keying (MSK) signal that is based on values of the chips indicated by the I and Q signal 128 represented by half sine pulse shaping and represented as $$\sin\left(\frac{\pi t}{2T_c}\right) \pm j\cos\left(\frac{\pi t}{2T_c}\right)$$

and RF signal for transmission per chip represented as $\sin(2\pi(f_i \pm f_c)t)$. In examples, the transmit apparatus 100 results in a transmit signal with characteristics of the MSK signal with improved containment in a channel bandwidth to reduce adjacent channel interference. Further, the plots indicate a frequency deviation, frequency spectrum, and phase trajectory based on a filtered FSK signal which is equivalent to an FSK signal generated by filtering a frequency deviation signal as described above.

Plot 202 shows frequency deviation on axis 208 and time on axis 210 and the frequency deviation signal 222 of an MSK signal as a function of time and a frequency deviation signal 220 output by the frequency deviation circuit 130 as a function of time. A magnitude of the frequency deviation signal 222 toggles between +/−500 kHz in the plot 202 as a function of time while the magnitude of the frequency deviation signal 220 in the plot 202 varies above or below +/−500 kHz as a function of time in the example. Plot 204 shows a power spectral density (PSD) on axis 212 and frequency on axis 214 and the PSD 224 of an FSK signal output by the frequency deviation circuit 130 as a function of frequency and a PSD 226 of the MSK signal. The PSD 224 and PSD 226 are similar in a pass band of the filter 106 shown as −1 to +1 MHz but the PSD 224 is attenuated out of band compared to the PSD 226 as a result of the filtering which is preferable. Plot 206 shows instantaneous phase on axis 216 and time on axis 218 and a phase signal 230 of a phase of an MSK signal generated based on the frequency deviation signal of the MSK signal and a phase signal 228 of a phase of an FSK signal generated based on the frequency deviation signal output by the frequency deviation circuit 132 as a function of time. The phase signal 228 as a result of the filtering has a different phase trajectory compared to the phase signal 230.

Plots 232-236 show the frequency deviation signal, PSD, and phase trajectory of the transmit signal output by the transmit apparatus 100 based on processing of the frequency deviation signal by the scale frequency deviation circuit 108 and the limit frequency deviation circuit 110 in accordance with an embodiment. Plot 232 shows frequency deviation on axis 238 and time on axis 240 and the frequency deviation signal 254 output by the limit frequency deviation circuit 110 as a function of time and a frequency deviation signal 226 of an MSK signal as a function of time. In an example, a magnitude of the fixed frequency deviation 254, 226 are substantially fixed between +/−500 kHz Hz similar to the MSK signal instead of varying above or below +/−500 kHz in the example shown in plot 202. Plot 234 shows power spectral density (PSD) on axis 242 and frequency on axis 244 and the PSD 226 of MSK signal as a function of frequency, the PSD 224 of an FSK signal generated based on the frequency deviation signal output by the frequency deviation circuit 130 as a function of frequency, and a PSD 250 of an FSK signal generated based on the frequency deviation signal output by the limit frequency deviation circuit 110 as a function of frequency. The side lobes present out of band are continued to be suppressed in the PSD 250. Plot 236 shows phase on axis 246 and time on axis 248 and a phase signal 230 of a phase of a FSK signal generated based on the frequency deviation signal of an MSK signal as a function of time, a phase signal 228 of a phase of an FSK signal generated based on the frequency deviation signal output by the frequency deviation circuit 130 as a function of time, and a phase signal 252 of a phase of an FSK signal generated based on the frequency deviation signal output by the limit frequency deviation circuit 110 as a function of frequency. The phase signal 252 has a substantially same phase trajectory compared to the phase trajectory of the phase signal 230 of the MSK signal.

A root mean square (RMS) error vector magnitude (EVM) is a scalar distance between end points of two phasor representing an ideal and actual measured chip positions in the constellation 116. In an example, the EVM of an indication of IQ components of constellation points received via transmission of an FSK signal output by the FSK modulation circuit 104 compared to an indication of the actual IQ components transmitted may be 1.49%. In an example, the EVM of an indication of IQ components of constellation points received via an FSK signal based on the frequency deviation signal output by the frequency deviation circuit 130 compared to an indication of the actual IQ components transmitted may be 4.43%. In an example, the EVM of an indication of IQ components of constellation points received via a scaling and limiting of a frequency deviation signal in accordance with the embodiments compared to an indication of the actual IQ components transmitted may be 1.76%. In examples, the disclosed scaling and frequency deviation limiting results in an EVM substantially equivalent to the FSK signal output by the FSK modulation circuit 104 with the benefit that the sidelobes out of band in the PSD of the FSK signal are suppressed while maintaining a phase trajectory of an MSK signal.

Example Methods

Figure 3:
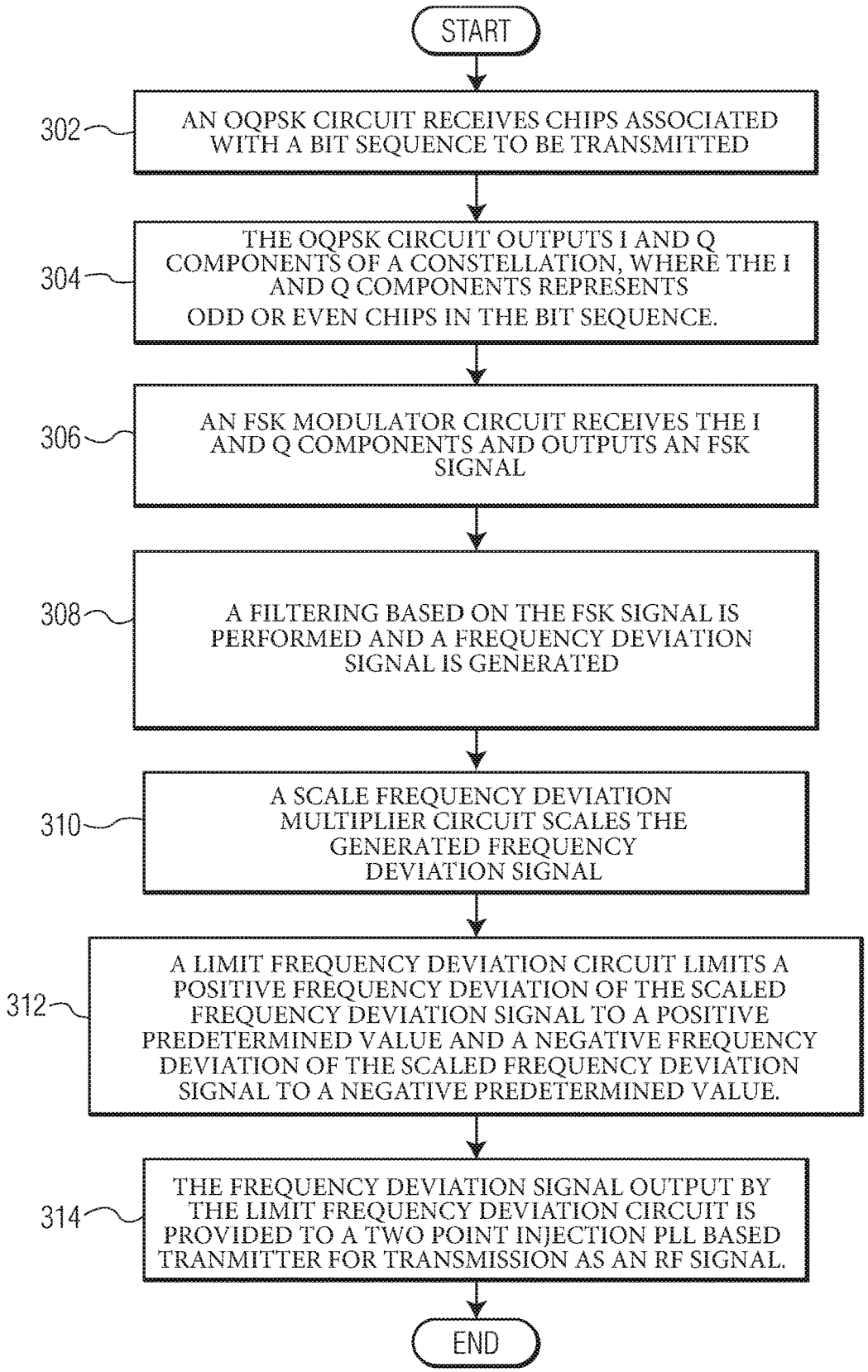
FIG. 3 is an example flow chart of functions associated with performing a scaling and limiting of the frequency deviation signal of the transmit apparatus in accordance with an embodiment.

FIG. 3 is an example flow chart of functions associated with performing a scaling and limiting of a frequency deviation of the transmit apparatus 100 in accordance with an embodiment. The functions may be performed by the transmit apparatus 100 in an example.

At 302, an O-QPSK circuit receives chips associated with a bit sequence to be transmitted to a receiver. The chips which are bits may be mapped to constellation points in a QPSK constellation. At 304, the OQPSK circuit outputs I and Q components of a constellation, where the I and Q components represents odd or even chips in the bit sequence. At 306, an FSK modulator circuit receives the I and Q components and outputs an FSK signal. A frequency deviation signal is associated with an FSK signal and the FSK signal may have side lobes in a signal spectrum that is not well contained within a transmit channel such as a 2 MHz channel. At 308, a filtering based on the FSK signal is performed and a frequency deviation signal is generated. The filtering may be a Gaussian filter in an example that is applied to a frequency deviation signal of the FSK signal or applied the FSK signal and then generating the frequency deviation signal from the filtered FSK signal. An FSK signal generated based on the frequency deviation signal after a filtering process has a desired bandwidth. At 310, a scale frequency deviation multiplier circuit scales the frequency deviation signal. A value of the scalar may be determined experimentally and is chosen to cause a positive frequency deviation of the frequency deviation signal which is less than a positive predetermined value such as 500 kHz to be scaled to a positive predetermined value and a negative frequency deviation of the frequency deviation signal which is a less than a negative predetermined value such as −500 kHz to be scaled to the negative predetermined value. The scaling may be a multiplication operation by a value greater than one in the example. At 312, a limit frequency deviation circuit limits a positive frequency deviation of the scaled frequency deviation signal to the positive predetermined value and a negative frequency deviation of the scaled frequency deviation signal to the negative predetermined value. At 314, the frequency deviation signal output by the limit frequency deviation circuit 110 is provided to an two-point injection PLL based transmitter for transmission as an RF signal. The two-point injection PLL may convert the frequency deviation signal to a phase of a transmit signal. The scaling and limiting results in an FSK signal to have a frequency deviation with a respective fixed frequency deviation indicative of "0" and "1" chips and phase trajectory similar to an FSK signal output by the FSK modulation circuit 104.

In an embodiment, a method is disclosed. The method comprises: determining an in phase component and a quadrature phase component of groups of chips mapped to constellation points of a quadrature phase shift keying (QPSK) constellation, wherein the in phase component and the quadrature phase component are delayed based on a period of the chip; performing a filtering based on a frequency shift keying (FSK) signal generated from the in phase component and the quadrature phase component; generating a frequency deviation signal as a function of time based on the filtering; scaling the frequency deviation signal by a scale factor; limiting frequency deviations indicated by the scaled frequency deviation signal; and transmitting an FSK signal based on the limited and scaled frequency deviation signal. In an example, scaling the frequency deviation signal comprises scaling the frequency deviation signal by a scaling factor with a value greater than one to cause a positive frequency deviation of the frequency deviation signal to be scaled to at least a positive predetermined value and a negative frequency deviation of the frequency deviation signal to be scaled to at least a negative predetermined value. In an example, the positive predetermined value and negative frequency deviation is +500 kHz and −500 kHz respectively. In an example, limiting frequency deviations indicated by the scaled frequency deviation signal comprises determining a scaled frequency deviation in the scaled frequency deviation signal and adjusting the scaled frequency deviation in the scaled frequency deviation signal to a predetermined value based on a magnitude of the scaled frequency deviation exceeding the predetermined value. In an example, generating the frequency deviation signal comprises filtering the FSK signal generated from the in phase component and the quadrature phase component by a Gaussian filter and generating the frequency deviation signal based on the filtered FSK signal. In an example, generating the frequency deviation signal comprises filtering a frequency deviation signal of the FSK signal generated from the in phase component and the quadrature phase component by a Gaussian filter. In an example, the transmitted signal has a fixed frequency deviation and a phase trajectory substantially the same as a minimum phase shift keying (MSK) signal, wherein the fixed frequency deviation toggles between one of a positive and a negative deviation. In an example, the filtering is filter is a Gaussian pulse shaping filter with a passband of 2 MHz and a normalized 3-dB bandwidth-symbol time product BTs of 0.5, 0.7, or 2.0. In an example, the transmitted signal conforms with Institute of Electrical and Electronics Engineers (IEEE) 802.15.4 standard. In an example, an error vector magnitude (EVM) of the transmitted signal is substantially the same as the FSK signal generated from the in phase component and the quadrature phase component.

In another embodiment, a transmit apparatus is disclosed. The transmit apparatus comprises: a quadrature phase shift keying (QPSK) circuit arranged to determine an in phase component and a quadrature phase component of groups of chips mapped to constellation points of a QPSK constellation, wherein the in phase component and the quadrature phase component are delayed based on a period of the chip; a frequency shift keying (FSK) circuit arranged to generate an FSK signal based on the in phase component and the quadrature phase component; a frequency deviation circuit arranged to filter based on the FSK signal and generate a frequency deviation signal as a function of time based on the filtering; a scaler arranged to scale the filtered frequency deviation signal by a scale factor; a limiter arranged to limit frequency deviations of the scaled frequency deviation signal; and a phase locked loop (PLL) based transmitter arranged to transmit a signal based on the limited and scaled frequency deviation signal. In an example, the scaler arranged to scale the frequency deviation signal comprises the scaler arranged to scale the frequency deviation signal by a scaling factor by a value greater than one to cause a positive frequency deviation of the frequency deviation signal to be scaled to at least a positive predetermined value and a negative frequency deviation of the frequency deviation signal to be scaled to at least a negative predetermined value. In an example, the positive predetermined value and negative frequency deviation is +500 kHz and −500 kHz respectively. In an example, the limiter arranged to limit frequency deviations indicated by the scaled frequency deviation signal comprises the frequency limiter arranged to determine a scaled frequency deviation in the scaled frequency deviation signal and adjust the scaled frequency deviation in the scaled frequency deviation signal to a predetermined value based on a magnitude of the scaled frequency deviation exceeding the predetermined value. In an example, the frequency deviation circuit arranged to generate the frequency deviation signal comprises the frequency deviation circuit arranged to filter the FSK signal generated from the in phase component and the quadrature phase component by a Gaussian filter. In an example, the frequency deviation circuit arranged to generate the frequency deviation signal comprises the frequency deviation circuit arranged to filter a frequency deviation signal of the FSK signal generated from the in phase component and the quadrature phase component by a Gaussian filter. In an example, the signal transmitted has a fixed frequency deviation and a phase trajectory substantially the same as an MSK signal, wherein the fixed frequency deviation is one of a positive and negative value. In an example, the filter is a Gaussian pulse shaping filter with a passband of 2 MHz and a normalized 3-dB bandwidth-symbol time product BTs of 0.5, 0.7, or 2.0. In an example, an error vector magnitude (EVM) of the transmitted signal is substantially the same as the FSK signal generated from the in phase component and the quadrature phase component. In an example, the transmitted signal conforms with Institute of Electrical and Electronics Engineers (IEEE) 802.15.4 standard.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

We claim:

1. A method comprising:
   determining an in-phase component and a quadrature phase component of groups of chips mapped to constellation points of a quadrature phase shift keying (QPSK) constellation, wherein the in-phase component and the quadrature phase component are delayed based on a period of a chip;
   performing a filtering based on a frequency shift keying (FSK) signal generated from the in-phase component and the quadrature phase component;
   generating a frequency deviation signal as a function of time based on the filtering;
   scaling the frequency deviation signal by a scale factor;
   limiting frequency deviations indicated by the scaled frequency deviation signal; and
   transmitting an FSK signal based on the limited frequency deviations and the scaled frequency deviation signal.

2. The method of claim 1, wherein scaling the frequency deviation signal by the scaling factor with a value greater than one to cause a positive frequency deviation of the frequency deviation signal to be scaled to at least a positive predetermined value and a negative frequency deviation of the frequency deviation signal to be scaled to at least a negative predetermined value.

3. The method of claim 2, wherein the positive predetermined value is +500 kHz and the negative frequency deviation is −500 kHz.

4. The method of claim 1, wherein limiting the frequency deviations indicated by the scaled frequency deviation signal comprises determining a scaled frequency deviation in the scaled frequency deviation signal and adjusting the scaled frequency deviation in the scaled frequency deviation signal to a predetermined value based on a magnitude of the scaled frequency deviation exceeding the predetermined value.

5. The method of claim 1, wherein generating the frequency deviation signal comprises filtering the FSK signal generated from the in-phase component and the quadrature phase component by a Gaussian filter and generating the frequency deviation signal based on the filtered FSK signal.

6. The method of claim 1, wherein generating the frequency deviation signal comprises filtering a frequency deviation signal of the FSK signal generated from the in-phase component and the quadrature phase component by a Gaussian filter.

7. The method of claim 1, wherein the transmitted FSK signal has a fixed frequency deviation and a phase trajectory substantially the same as a minimum phase shift keying (MSK) signal, wherein the fixed frequency deviation toggles between one of a positive deviation and a negative deviation.

8. The method of claim 1, wherein the filtering is filter is performed by a Gaussian pulse shaping filter with a passband of 2 MHz and a normalized 3-dB bandwidth-symbol time product BTs of 0.5, 0.7, or 2.0.

9. The method of claim 1, wherein the transmitted FSK signal conforms with Institute of Electrical and Electronics Engineers (IEEE) 802.15.4 standard.

10. The method of claim 1, wherein an error vector magnitude (EVM) of the transmitted FSK signal is substantially the same as the FSK signal generated from the in-phase component and the quadrature phase component.

11. A transmit apparatus comprising:
a quadrature phase shift keying (QPSK) circuit arranged to determine an in-phase component and a quadrature phase component of groups of chips mapped to constellation points of a QPSK constellation, wherein the in-phase component and the quadrature phase component are delayed based on a period of a chip;
a frequency shift keying (FSK) modulation circuit arranged to generate an FSK signal based on the in-phase component and the quadrature phase component;
a frequency deviation circuit arranged with a filter to filter based on the FSK signal and generate a frequency deviation signal as a function of time based on the filtering;
a scaler arranged to scale the filtered frequency deviation signal by a scale factor;
a frequency limiter arranged to limit frequency deviations of the scaled frequency deviation signal; and
a phase locked loop (PLL) based transmitter arranged to transmit a signal based on the limited frequency deviations and the scaled frequency deviation signal.

12. The transmit apparatus of claim 11, wherein the scaler arranged to scale the filtered frequency deviation signal by the scale factor with a value greater than one to cause a positive frequency deviation of the frequency deviation signal to be scaled to at least a positive predetermined value and a negative frequency deviation of the frequency deviation signal to be scaled to at least a negative predetermined value.

13. The transmit apparatus of claim 12, wherein the positive predetermined value is +500 kHz and the negative frequency deviation is −500 KHz.

14. The transmit apparatus of claim 11, wherein the frequency limiter arranged to limit the frequency deviations indicated by the scaled frequency deviation signal comprises the frequency limiter arranged to determine a scaled frequency deviation in the scaled frequency deviation signal and adjust the scaled frequency deviation in the scaled frequency deviation signal to a predetermined value based on a magnitude of the scaled frequency deviation exceeding the predetermined value.

15. The transmit apparatus of claim 11, wherein the frequency deviation circuit arranged to generate the frequency deviation signal comprises the frequency deviation circuit arranged to filter the FSK signal generated from the in-phase component and the quadrature phase component by a Gaussian filter.

16. The transmit apparatus of claim 15, wherein the frequency deviation circuit arranged to generate the frequency deviation signal comprises the frequency deviation circuit arranged to filter a frequency deviation signal of the FSK signal generated from the in-phase component and the quadrature phase component by a Gaussian filter.

17. The transmit apparatus of claim 16, wherein the transmitted signal has a fixed frequency deviation and a phase trajectory substantially the same as a minimum shift keying (MSK) signal, wherein the fixed frequency deviation is one of a positive value and a negative value.

18. The transmit apparatus of claim 11, wherein the filter is a Gaussian pulse shaping filter with a passband of 2 MHz and a normalized 3-dB bandwidth-symbol time product BTs of 0.5, 0.7, or 2.0.

19. The transmit apparatus of claim 11, wherein an error vector magnitude (EVM) of the transmitted signal is substantially the same as the FSK signal generated from the in-phase component and the quadrature phase component.

20. The transmit apparatus of claim 11, wherein the transmitted signal conforms with Institute of Electrical and Electronics Engineers (IEEE) 802.15.4 standard.

* * * * *